Figure 1:
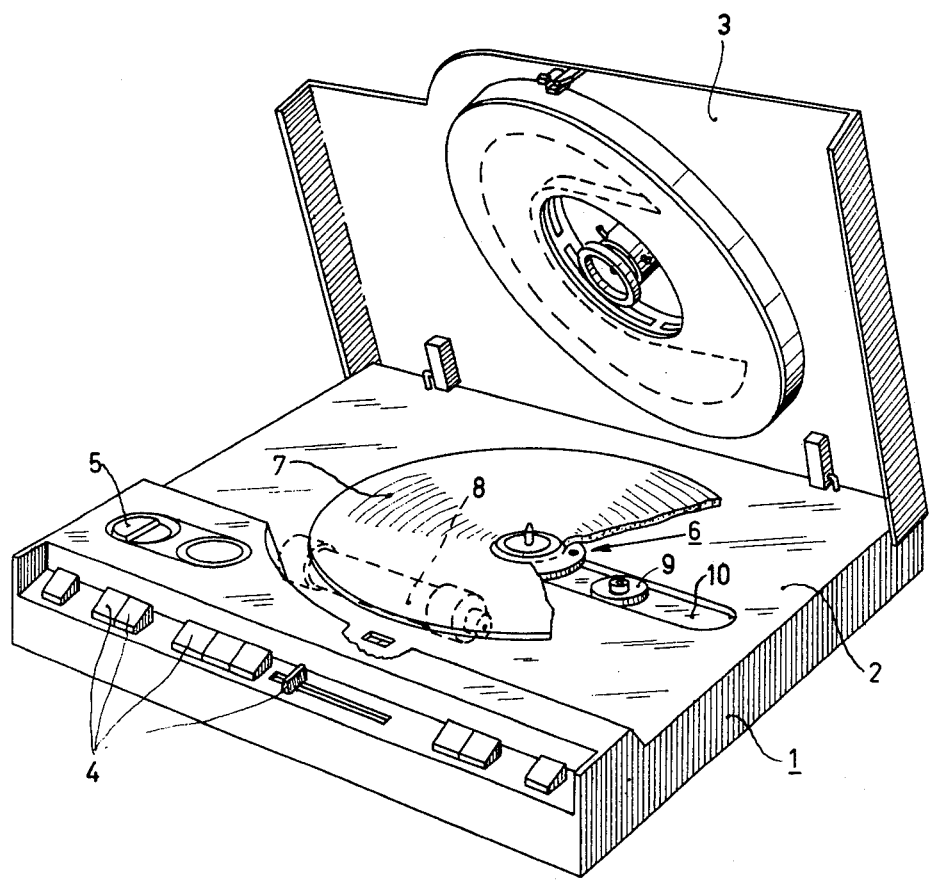

United States Patent [19]

Van Vroenhoven

[11] 4,106,057

[45] Aug. 8, 1978

[54] DUST PROOF OPTICAL SYSTEM FOR OPTICALLY READING AND WRITING ON A ROTATING RECORD WITH THE AID OF A RADIATION BEAM

[75] Inventor: Petrus Adrianus Wilhelmus Van Vroenhoven, Indhoven, Netherlands

[73] Assignee: U.S. Philips Corporation, New York, N.Y.

[21] Appl. No.: 715,310

[22] Filed: Aug. 18, 1976

[30] Foreign Application Priority Data

May 20, 1976 [NL] Netherlands .................. 7605374

[51] Int. Cl.$^2$ .................. H04N 5/76; G11B 7/12
[52] U.S. Cl. .................. 358/128; 179/100.3 V; 350/61
[58] Field of Search .................. 179/100.3 V; 358/128; 350/61, 67, 319, DIG. 1; 360/137

[56] References Cited

U.S. PATENT DOCUMENTS

| | | | |
|---|---|---|---|
| 3,539,710 | 11/1970 | Cross et al. | 350/61 |
| 3,839,601 | 10/1974 | Kimura | 179/100.3 V |
| 3,977,684 | 8/1976 | Camerik | 179/100.3 V |
| 4,001,892 | 1/1977 | Castelli et al. | 360/137 |
| 4,021,101 | 5/1977 | Camerik | 179/100.3 V |

FOREIGN PATENT DOCUMENTS 1,380,469  1/1975  United Kingdom ............ 179/100.3 V

OTHER PUBLICATIONS

Kramer et al., The Philips 'ULP' System, Philips Tech. Rev., 33 No. 7, 1973, pp. 178–180.

*Primary Examiner*—Raymond F. Cardillo, Jr.
*Attorney, Agent, or Firm*—Frank R. Trifari; Simon L. Cohen

[57] ABSTRACT

Apparatus for optically reading and/or recording information on a rotary record with the aid of a radiation beam, in particular a video player, in which a carriage which is movable to and fro underneath a deck and carries a focussing device with an objective, as well as a number of other optical elements belonging to a scanning device and, as the case may be, a radiation source for producing the radiation beam. In order to prevent dust and other air-borne contaminations from settling on the optical faces of the optical elements of the scanning unit, at least a number and preferably all optical elements are protected against dust by a dust cover. If required, a completely dust-proof enclosure of the optical elements and the part of the radiation source from which the radiation beam emerges may be employed, the electrical connections to the electrical equipment located inside the enclosure being made via dust-proof passages and furthermore the objective being guided in a dust-proof manner in a parallel guide system, while the dust cover adjoins the carriage and, if desired, the radiation source with the aid of dust-strips.

3 Claims, 4 Drawing Figures

DUST PROOF OPTICAL SYSTEM FOR OPTICALLY READING AND WRITING ON A ROTATING RECORD WITH THE AID OF A RADIATION BEAM

The invention relates to apparatus for optically reading and/or writing on a rotating record with the aid of a radiation beam. In particular it relates to a video record player, comprising: a housing; a rotating record spindle; a radiation source for producing the radiation beam; a number of optical elements which include a movable objective which with a part which faces the outside of the housing is movable in a slot in a wall of the housing and which serves for focussing the radiation beam at a record to be read or to be written on; a number electrical means which co-operate with the optical means, such as one or more radiation-sensitive electronic components for converting a radiation beam modulation into an electrical modulation, and one or more control coils for controlling controllably movable optical elements such as the objective; and a carriage on which the said optical and electrical elements are mounted, which carriage is movable inside the housing transversely to the rotatable record spindle.

A video player of the type mentioned in the preamble has previously been proposed and described by the Applicant in a number of articles in "Philips Technical Review," Volume 33, 1973, no. 7, pages 178 through 193. In this known video player a video record is read from the underside with the aid of a laser beam obtained from a helium/neon gas laser. The video record is provided with information in an information plane which is reflecting, so that a laser beam which is projected at the underside is reflected by the record and via optical means is returned to the radiation-sensitive electronic means which convert the light modulation of the reflected beam into an electrical modulation. The video player is provided with a scanning unit with an objective which is kept in focus at the information plane by means of a controllable electromechanical system which is based on a loudspeaker system. A pivotable mirror ensures that the laser beam is constantly directed at the information track; the mirror is electrodynamically controlled with the aid of a rotating coil. The projected and reflected laser beam are separated from each other with the aid of a prism, the reflected beam being supplied to a radiation sensitive electronic element, as previously stated.

The complete scanning unit can move to and fro transversely to a record spindle, because it is mounted on a carriage which is movable underneath the deck of the video player with the aid of a parallel guide means. The carriage is driven by a motor, so that the objective remains continuously roughly directed at the information track.

In addition to the optical means a lens is required which causes the laser beam to diverge to a beam of a diameter which is suitable for the purpose.

It is of importance to ensure that the optical faces (i.e. the surfaces of the optical means such as mirrors, prisms, lenses etc) via which the laser beam is reflected on its way to and fro (mirrors, prisms) or through which the laser beam passes (lenses, prisms etc) are contaminated to the least possible extent. When dust or other contaminations from the ambient air settle on said surfaces a reduction of the intensity of the radiation beam which eventually arrives at the video record will result, while moreover the part of the radiation beam which returns to the scanning unit also loses intensity on its way to the radiation-sensitive electronic components via the optical elements to be passed. Contamination of the optical surfaces not only results in a part of the radiation beam being absorbed, but it also gives rise to dispersion at each surface. These effects may become so serious that a correct read-out of the information on the video record is no longer possible and the quality of the reproduced television image deteriorates distinctly. It is an object of the invention to provide a solution to this problem and the invention is characterized in that at least a number of said optical elements are jointly accommodated in an enclosure which is secured to the carriage and which guards against dust which is present in the interior of the housing.

The advantages of the enclosure are not only that it prevents dust from settling on the optical faces, but that it can also provide a mechanical protection against damage to the scanning unit. Furthermore, the enclosure may add to the safety of the apparatus because in the event of mechanical faults in the optical section, the laser beam can be prevented from inadvertantly being projected outside the scanning unit in an undesired manner, which might present a hazard during assembly and maintenance activities. In a practical embodiment of the invention the enclosure consist of a readily removable dust cover.

If the radiation source is stationarily secured to the carriage it is advantageous to employ a further embodiment which is characterized in that at least that part of the radiation source from which the radiation beam emerges and the part of the objective which faces the interior of the housing of the apparatus and furthermore all other optical elements are protected against dust in the interior of the apparatus by the enclosure.

When a video player or a similar apparatus is to be installed in an atmosphere of smoking or where airborne fatty substances may settle on the optical faces, it will be likely that an embodiment has to be used in which the compartment enclosed by the enclosure is sealed in a completely dust-proof manner, the electrical connections to electrical means which are located inside the enclosure being established via dust-proof passages through a wall of the compartment and the objective being movable in a dust-proof guide means, and furthermore, when the radiation source is completely or partly disposed outside the enclosure, the radiation source adjoining a wall of the compartment being sealed in a dust-proof manner.

Figure 2:
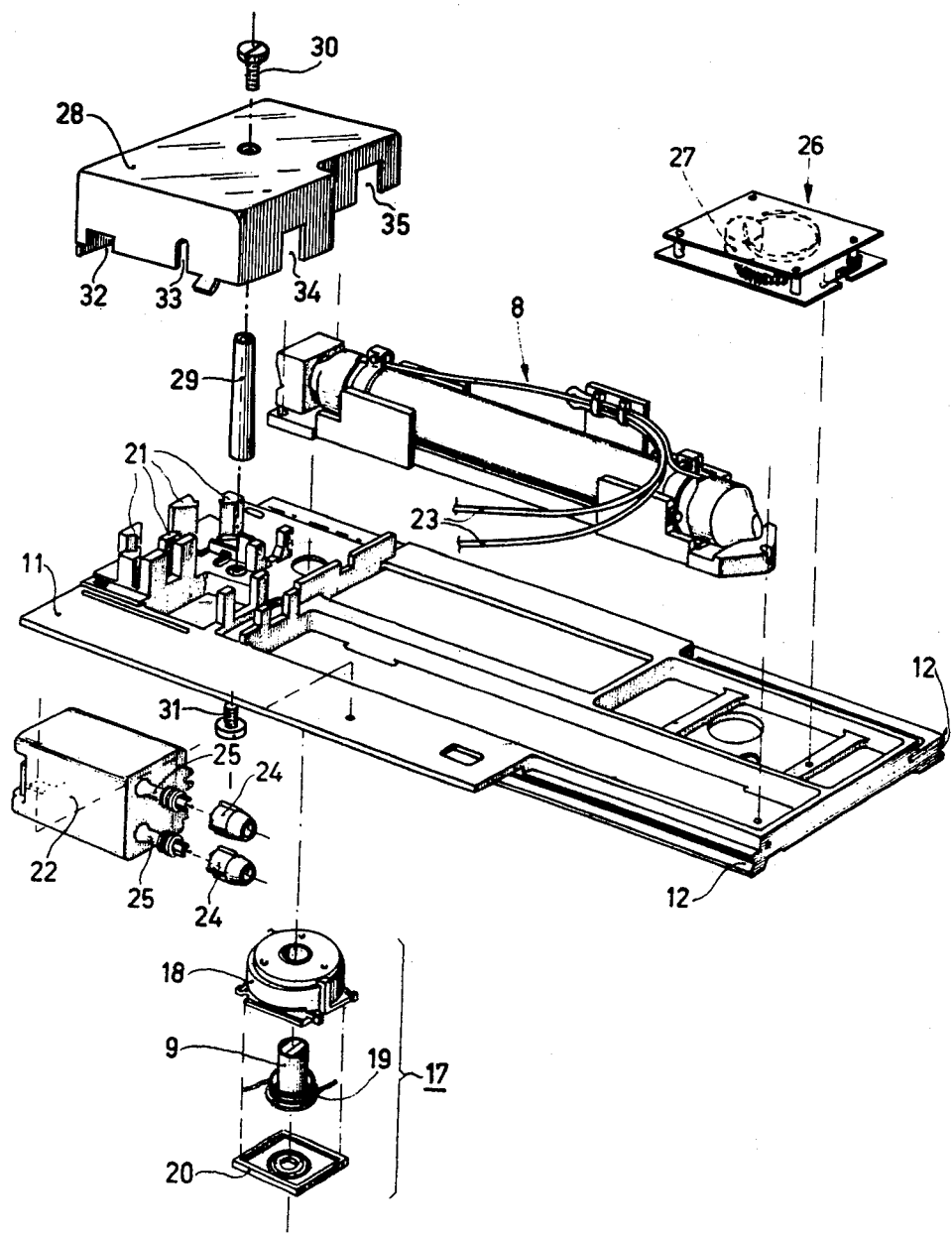
Figure 3:
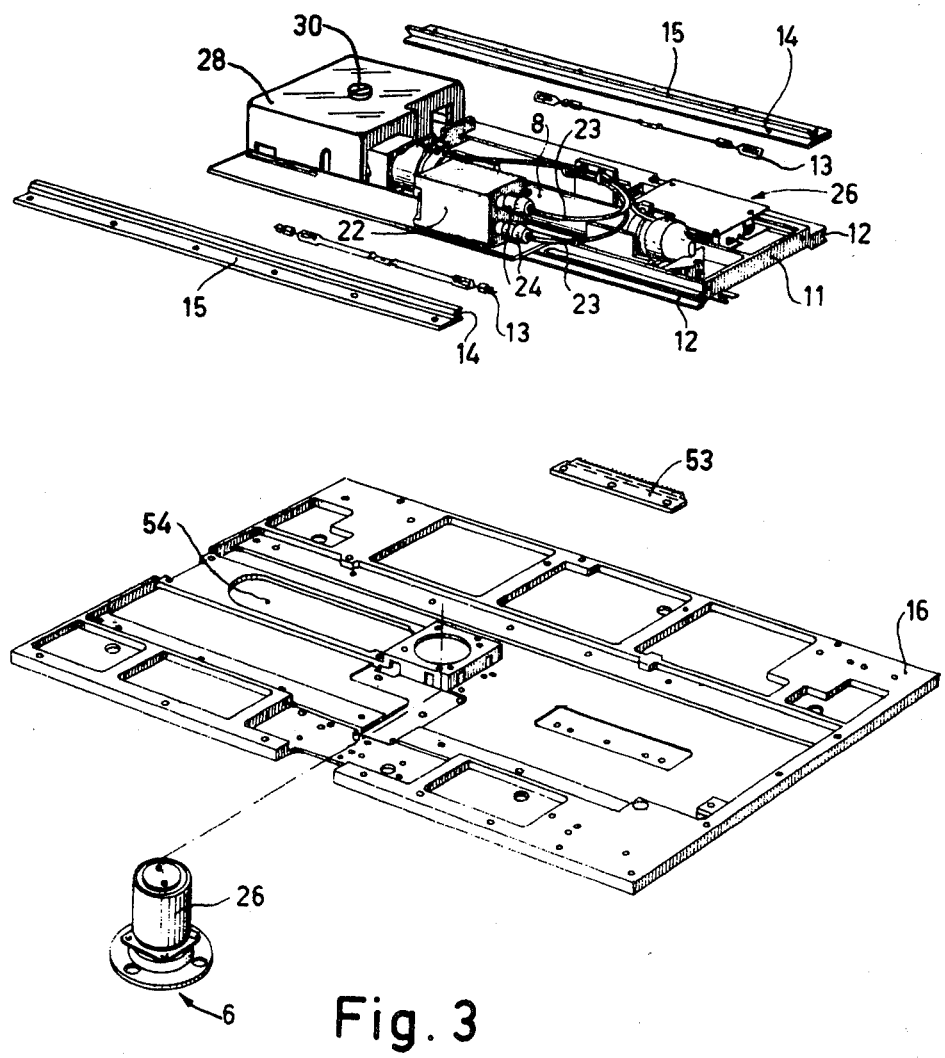
Figure 4:
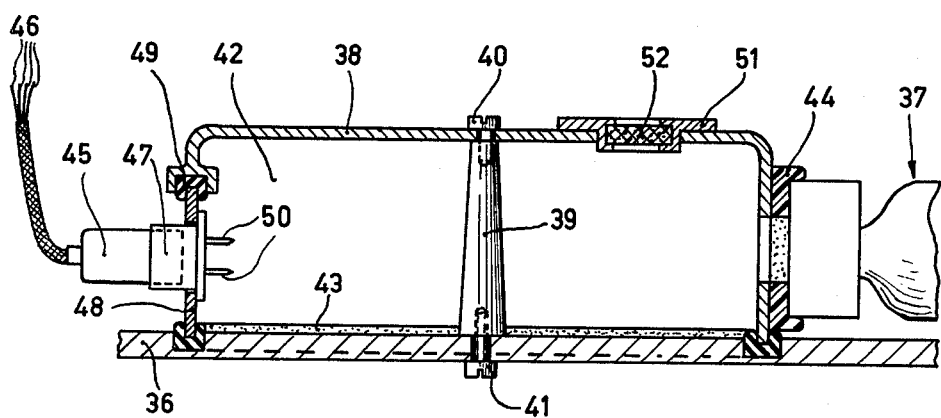

The invention will be described in more detail with reference to the drawings, in which:

FIG. 1 is a schematic perspective view of a video player with opened cover and with a video record, which is partly cut away in the Figure, in position, FIG. 2 is an exploded view of a carriage, viewed from underneath, for a video player in accordance with FIG. 1, with helium/neon gas laser as well as some other components mounted on it, FIG. 3 shows the assembly of the carriage of FIG. 2 and the associated components, again viewed from underneath, in an exploded view of a mounting unit with a mounting plate, and FIG. 4 schematically represents the principle of an embodiment of the invention in which a fully dust-proof compartment is covered by a dust cover.

The video player of FIG. 1 comprises a housing 1 whose top part is formed by a deck 2, to which a cover 3 is hinged. At the front of the apparatus a number of controls 4 are located for controlling the various functions, as well as a switching knob 5. On a rotatable record spindle 6 a video record 7 is located, which record contains optically readable recording tracks which can be read at the side of the record which faces the deck 2. For reading the record 7, a laser 8 is provided underneath the deck 2 in the housing 1, which can produce a radiation beam, not shown, is supplied to a scanning unit. The scanning unit inter alia comprises an objective 9 which is movable in a slot 10 in the deck 2 in a direction transverse to the record spindle 6. The objective 9 for focussing the radiation beam at the video record 7 is secured to a carriage underneath the deck 2, which carriage is movable transversely to the rotatable record spindle 6.

FIG. 2 shows this carriage viewed from underneath, the carriage bearing the reference numeral 11. The carriage is integrally manufactured from a metal and comprises V-shaped guide grooves 12 at its sides, which grooves co-operate with roller bearings 13, see FIG. 3. These roller bearings have rollers which, apart from in the guide grooves 12, run in guide grooves 14 of guide ways 15 which are secured to a mounting plate 16, which is located underneath the deck 2 of the video player and is rigidly connected to the housing 1.

Of the optical elements which are mounted on the carriage 11 only the objective 9 is shown. FIG. 2 shows that the objective forms part of a focussing device 17 which in addition to the objective 9 comprises a frame 18 in which an annular permanent magnet is located. In order to control the objective 9, the magnet co-operates with a coil 19 which is mounted on the objective. A rubber cap 20 covers the end of frame 18.

The other optical elements are mounted on the supports 21 which are disposed on the carriage 11, but which are not shown for the sake of simplicity. The laser beam which emerges from the laser follows a substantially U-shaped path before it is 90° deflected in the direction of the focussing device 17.

With the aid of suitable means, such as screws, the laser is mounted on the carriage in a fixed relationship with the fixed supports 21 and thus relative to the optical elements which are rigidly connected to the carriage with the aid of the supports.

For the ignition of the laser a high voltage ignition device 22 is provided. This device is also mounted on the carriage 11 with screws and is connected to the laser 8 by means of two insulated wires 23. For this purpose, the wires 23 are passed through threaded caps 24, which can be fitted onto hollow supports 25, so that the wires 23 which conduct the high voltage are firmly coupled to the ignition device 22.

Furthermore, a drive unit 26 is mounted on the carriage 11 for moving the carriage underneath the mounting plate 16. This unit comprises an electric motor 27 on which a pinion, not shown, is mounted which cooperates with a gear rack 53, see FIG. 3. By means of the motor 27 the complete carriage 11 can be moved to and fro relative to the mounting plate 16, the focussing device 17 then moving to and fro in a slot 54 in the mounting plate 16. During these movements the laser 8 remains in a fixed position relative to the supports 21 on the carriage 11 and thus relative to the optical elements not shown, which are rigidly mounted on it. It is evident that the ignition device as well as other electrical means (for example for controlling the movements of the objective and the other movable optical elements), in addition to the motor 27) should constantly be electrically connected to electrical means which are stationarily mounted in the housing 1 of the video player. The connecting wires should then be capable of following the (relative) movement of the carriage 11 relative to the mounting plate 16.

FIGS. 2 and 3 show an enclosure for the optical elements mounted on the fixed supports 21 and also for the part of the objective 17 which faces the interior of the video player. The enclosure consists of a dust cover 28 which is connected to the carriage 11 with the aid of a support 29 and two screws 30 and 31. The dust cover is made of a plastic and can readily be mounted as well as removed by loosening the screw 30, so as to simplify assembly and future service activities. In two of the side walls a number of recesses 32 through 35 are formed. The recesses 32 and 33 serve for the passage of electrical connecting wires, the recess 34 for the passage of a radiation beam from the laser 8 and the recess 35 again for the passage of electrical connecting wires.

With the aid of the dust cover 28 all optical elements of the video player are protected against dust. The part of the laser 8 from which the radiation beam emerges is also protected against dust in the interior of the video player, see FIG. 3. In this case protection is obtained in that the cover 28 adjoins the end of the laser 8, so that dust cannot readily settle on this end.

Should the protection of the optical surfaces afforded by the dust cover 28 be inadequate, an embodiment may be used as schematically shown in FIG. 4. This Figure shows a carriage bearing the reference numeral 36, a laser 37, a dust cover 38, a support for the dust cover 39, and two screws 40 and 41 for securing the dust cover. In this embodiment the compartment 42 inside the dust cover 38 is sealed from the environment in a completely dust-proof manner. The carriage 36 has no passages which communicate with the compartment 42. FIG. 4 does not show that use is made of a focussing device as denoted by 17 in FIG. 2, which has a dust-proof parallel guide means for the objective 9. For a further description of such a focussing device reference is made to the Applicant's U.S. Pat. No. 4,021,101, issued May 3, 1977 (which is assumed to be incorporated by reference). The underside of the dust cover 38 adjoins the carriage 36 by means of a foam plastic dust strip 43. Between the end of the laser 37 and the dust cover 38 a foam plastic dust pad 44 is fitted, which may for example be glued to the dust cover. A completely dust-proof passage of electrical connections to the compartment 42 can be achieved with the aid of a plug connector 45, to which a number of electrical connecting wires 46 may be connected, and a socket connector 47. This socket connector is fitted on a mounting plate 48 in a suitable manner, for example with the aid of a screw connection, the plate adjoining the carriage 36 via the dust strip 43 and the dust cover 38 via a second dust strip 49 in a dust-proof manner. The wires inside the enclosure 42 can be connected to the pins 50 of the socket connector 47.

In the upper part of the dust cover 38 a provision is made which serves for equalizing the air pressures in the compartment 42 and the space outside. This provision consists of a holder 51 which is glued to the dust cover 38 and in which a filter 52 is located which filters dust and other contaminations which may affect the optical faces from the air.

What is claimed is:

1. An improved apparatus for optically reading a rotating record with the aid of a radiaton beam, comprising:
   a housing,
   a rotating record spindle,
   a radiation source for producing at an end thereof the radiation beam,
   a number of optical elements which include a movable objective which with a part which faces the outside of the housing is movably mounted in a slot in a wall of the housing and which serves for focussing the radiation beam at a record to be read,
   a number of electrical means which co-operate with the optical means, including at least one radiation-sensitive electronic component for converting a radiation beam modulation into an electrical modulation, and at least one control coil for controlling controllably movable optical elements such as the objective, and
   a carriage which is movable inside the housing, transversely to the rotatable record spindle, on which carriage the said optical and electronic elements are mounted, the improvement wherein a part of the objective facing the interior of the housing and all other of said optical elements are jointly accommodated in an enclosure which is secured to the carriage and which provides protection against dust which is present in the interior of the housing, and wherein the end of the radiation source from which the radiation is emitted is sealed within the enclosure.

2. Apparatus as claimed in claim 1, wherein the enclosure consists of a readily removable dust cover.

3. Apparatus as claimed in claim 1, wherein the compartment enclosed by the enclosure is sealed in a dust-proof manner, and the electrical connections to the electrical means located inside the enclosure being established via dust-proof passages through a wall of the compartment and the objective being movable in a dust-proof guide means.

* * * * *